US012325419B2

(12) United States Patent
Zhang et al.

(10) Patent No.: US 12,325,419 B2
(45) Date of Patent: Jun. 10, 2025

(54) RULE-BASED ADAPTIVE CRUISE CONTROL SYSTEM FOR A VEHICLE

(71) Applicant: GM Global Technology Operations LLC, Detroit, MI (US)

(72) Inventors: Yubiao Zhang, Sterling Heights, MI (US); Sahm E. Litkouhi, Rochester Hills, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 191 days.

(21) Appl. No.: 18/446,768

(22) Filed: Aug. 9, 2023

(65) Prior Publication Data

US 2025/0050881 A1 Feb. 13, 2025

(51) Int. Cl.
*B60W 30/16* (2020.01)

(52) U.S. Cl.
CPC ....... *B60W 30/16* (2013.01); *B60W 2420/403* (2013.01); *B60W 2420/408* (2024.01); *B60W 2552/15* (2020.02); *B60W 2552/20* (2020.02); *B60W 2552/30* (2020.02); *B60W 2554/4041* (2020.02); *B60W 2720/10* (2013.01); *B60W 2754/30* (2020.02)

(58) Field of Classification Search
None
See application file for complete search history.

(56) References Cited

U.S. PATENT DOCUMENTS

| 9,008,940 B2 | 4/2015 | Ueyama et al. |
| 12,168,440 B2 * | 12/2024 | Ito ........................ B60W 30/16 |
| 2022/0324421 A1 * | 10/2022 | Giovanardi .......... G08G 1/0145 |

* cited by examiner

*Primary Examiner* — Todd Melton
(74) *Attorney, Agent, or Firm* — Vivacqua Crane, PLLC (57) ABSTRACT

A rule-based adaptive cruise control system for determining a vehicle-following behavior of a vehicle includes a plurality of perception sensors for collecting perception data representing an environment surrounding the vehicle and one or more controllers in electronic communication with the plurality of perception sensors. The one or more controllers categorize a profile of a roadway based on a route plan and the perception data into one of a plurality of roadway profiles that are each indicative of the geometry of the roadway, categorize detection of a preceding vehicle based on the perception data into one of a plurality of detection states, classify the selected roadway profile and the selected detection state into one of a plurality of scenarios based on a set of classification rules, and assign a specific vehicle-following behavior based on the selected scenario.

20 Claims, 4 Drawing Sheets

RULE-BASED ADAPTIVE CRUISE CONTROL SYSTEM FOR A VEHICLE

INTRODUCTION

The present disclosure relates to a rule-based adaptive cruise control system for a vehicle that determines a vehicle-following behavior based on a set of classification rules that consider the profile of the roadway and a detection state of a preceding vehicle.

Many vehicles include various driver assistance systems that support a driver in a variety of ways. For example, adaptive cruise control (ACC) systems may relieve drivers from routine longitudinal vehicle control by ensuring the host vehicle is an acceptable headway distance from a vehicle that immediately precedes the ego vehicle, which is referred to as the preceding vehicle. Adaptive cruise control systems determine longitudinal control an ego vehicle based on the movement of the preceding vehicle.

It is to be appreciated that current adaptive cruise control systems do not consider route planning information and instead determine the behavior of the ego vehicle based on perception data regarding the preceding vehicle and a target speed. The perception data regarding the preceding vehicle is collected by perception sensors such as a camera. As a result, when the preceding vehicle momentarily leaves the field-of-view or is undetectable by the perception sensors of the ego vehicle because of the road geometry, the adaptive cruise control system assumes that the preceding vehicle is no longer present and adjusts the speed of the ego vehicle accordingly. For example, when the preceding vehicle traverses a sharp bank angle in the roadway, a steep hill, a roundabout, or a merge lane, the preceding vehicle may momentarily leave the field-of-view of the ego vehicle's perception sensors, and the adaptive cruise control system may then instruct the ego vehicle to increase its speed to meet the target speed. However, once the preceding vehicle returns to the field-of-view of the perception sensors, then the adaptive cruise control system may instruct the ego vehicle to reduce or change its speed. Therefore, adaptive cruise control systems may unnecessarily increase and reduce the speed of a vehicle, which increases energy consumption and may adversely affect customer satisfaction.

Thus, while adaptive cruise control systems achieve their intended purpose, there is a need in the art for an improved approach to regulate the speed of an ego vehicle when the preceding vehicle is momentarily not detected by the ego vehicle's perception sensors.

SUMMARY

According to several aspects, a rule-based adaptive cruise control system for determining a vehicle-following behavior of a vehicle is disclosed. The rule-based adaptive cruise control system includes a plurality of perception sensors for collecting perception data representing an environment surrounding the vehicle, where the environment includes a roadway the vehicle is traveling along and the perception sensor include a field-of-view. The rules-based adaptive cruise control system also includes one or more controllers in electronic communication with the plurality of perception sensors. The one or more controllers execute instructions to receive a route plan and the perception data collected by the plurality of perception sensors. The one or more controllers categorize a profile of the roadway based on the route plan and the perception data into one of a plurality of roadway profiles that are each indicative of a geometry of the roadway. The one or more controllers categorize detection of a preceding vehicle based on the perception data into one of a plurality of detection states, wherein the plurality of detection states are indicative of the preceding vehicle momentarily falling outside the field-of-view of the perception sensors due to a geometry associated with the roadway. The one or more controllers classify a selected roadway profile and a selected detection state into one of a plurality of scenarios based on a set of classification rules and assign a specific vehicle-following behavior based on a selected scenario.

In another aspect, the preceding vehicle is located immediately in front of the vehicle along the roadway, and wherein the rule-based adaptive cruise control system maintains a predefined headway distance between the vehicle and the preceding vehicle.

In yet another aspect, a longitudinal control command indicating when the vehicle accelerates and decelerates is based on the vehicle-following behavior.

In an aspect, the set of classification rules are a set of conditional statements that classify the selected roadway profile and the selected detection state into the selected scenario.

In another aspect, the roadway profiles include the following: a straight-line profile, a curved profile, an uphill profile, and a downhill profile.

In yet another aspect, the straight-line profile indicates a level roadway.

In an aspect, the detection states includes a not detected state, a detected state, and a detected but disappeared state.

In another aspect, the detected but disappeared state indicates the preceding vehicle momentarily left the field-of-view of the plurality of perception sensors while traveling along the roadway.

In yet another aspect, the vehicle-following behavior instructs the vehicle to perform one of the following: follow a target speed, adhere to standard adaptive cruise control behavior, reduce speed to negotiate a curved profile, follow the preceding vehicle according to a speed limit to negotiate the curved profile, negotiate the curved profile without sudden acceleration, negotiate an uphill profile without sudden acceleration, negotiate a downhill profile based on an allowable speed variation, and negotiate the downhill profile without sudden acceleration.

In an aspect, the plurality of perception sensors include one or more of the following: one or more cameras, an inertial measurement unit (IMU), a global positioning system (GPS), radar, and LiDAR.

In another aspect, the rule-based adaptive cruise control system is part of an advanced driver-assistance system (ADAS).

In another aspect, a method for determining a vehicle-following behavior of a vehicle by a rule-based adaptive cruise control system is disclosed. The method includes receiving, by one or more controllers, a route plan and perception data collected by a plurality of perception sensors, where the perception data represents an environment surrounding the vehicle and the environment includes a roadway the vehicle is traveling along. The method includes categorizing a profile of the roadway based on the route plan and the perception data into one of a plurality of roadway profiles that are each indicative of a geometry of the roadway. The method also includes categorizing detection of a preceding vehicle based on the perception data into one of a plurality of detection states, where the plurality of detection states are indicative of the preceding vehicle momentarily falling outside a field-of-view of the perception sensors due to a geometry associated with the roadway. The method includes classifying a selected roadway profile and a selected detection state into one of a plurality of scenarios based on a set of classification rules. Finally, the method includes assigning a specific vehicle-following behavior based on a selected scenario.

In another aspect, a rule-based adaptive cruise control system for determining a vehicle-following behavior of a vehicle is disclosed. The rule-based adaptive cruise control system includes a plurality of perception sensors for collecting perception data representing an environment surrounding the vehicle, where the environment includes a roadway the vehicle is traveling along and the perception sensors include a field-of-view. The one or more controllers in electronic communication with the plurality of perception sensors. The one or more controllers execute instructions to receive a route plan and the perception data collected by the plurality of perception sensors. The one or more controllers execute instructions to categorize a profile of the roadway based on the route plan and the perception data into one of a plurality of roadway profiles that are each indicative of a geometry of the roadway. The one or more controllers categorize detection of a preceding vehicle based on the perception data into one of a plurality of detection states, where the plurality of detection states are indicative of the preceding vehicle momentarily falling outside the field-of-view of the perception sensors due to a geometry associated with the roadway, and where the preceding vehicle is located immediately in front of the vehicle along the roadway, and where the rule-based adaptive cruise control system maintains a predefined headway distance between the vehicle and the preceding vehicle. The one or more controllers classify a selected roadway profile and a selected detection state into one of a plurality of scenarios based on a set of classification rules and assign a specific vehicle-following behavior based on a selected scenario, where a longitudinal control command indicating when the vehicle accelerates and decelerates is based on the vehicle-following behavior.

In another aspect, the set of classification rules are a set of conditional statements that classify the selected roadway profile and the selected detection state into the selected scenario.

In yet another aspect, the roadway profiles include the following: a straight-line profile, a curved profile, an uphill profile, and a downhill profile.

In an aspect, the straight-line profile indicates a level roadway.

In another aspect, the detection states includes a not detected state, a detected state, and a detected but disappeared state.

In an aspect, the detected but disappeared state indicates the preceding vehicle momentarily left the field-of-view of the plurality of perception sensors while traveling along the roadway.

In another aspect, the vehicle-following behavior instructs the vehicle to perform one of the following: follow a target speed, adhere to standard adaptive cruise control behavior, reduce speed to negotiate a curved profile, follow the preceding vehicle according to a speed limit to negotiate the curved profile, negotiate the curved profile without sudden acceleration, negotiate an uphill profile without sudden acceleration, negotiate a downhill profile based on an allowable speed variation, and negotiate the downhill profile without sudden acceleration.

In yet another aspect, the plurality of perception sensors include one or more of the following: one or more cameras, an IMU, a GPS, radar, and LiDAR.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
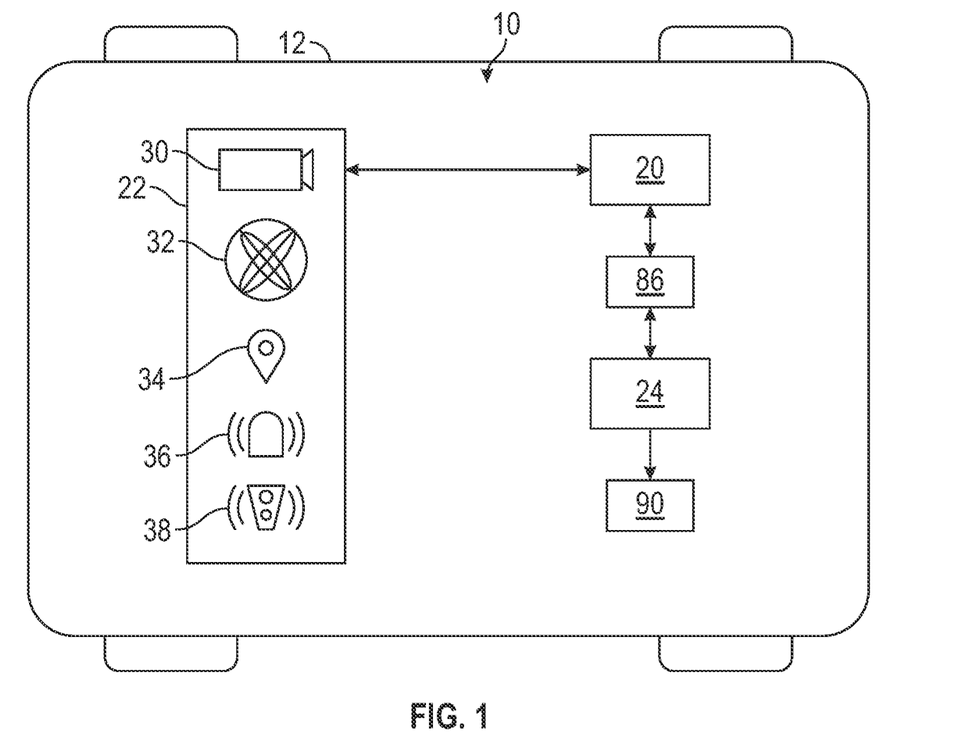
FIG. 1 is a schematic diagram of a vehicle including the disclosed rule-based adaptive cruise control system including one or more controllers in electronic communication with a plurality of perception sensors, according to an exemplary embodiment.

Referring to FIG. 1, a schematic diagram of an exemplary rule-based adaptive cruise control system 10 for a vehicle 12 is illustrated. It is to be appreciated that the vehicle 12 may be any type of vehicle such as, but not limited to, a sedan, truck, sport utility vehicle, van, or motor home. In one embodiment, the rule-based adaptive cruise control system 10 is part of an advanced driver-assistance system (ADAS) of the vehicle 12. The rule-based adaptive cruise control system 10 includes one or more controllers 20 in electronic communication with a plurality of perception sensors 22 configured to collect perception data indicative of an environment surrounding the vehicle 12. In the non-limiting embodiment as shown in FIG. 1, the plurality of perception sensors 22 include one or more cameras 30, an inertial measurement unit (IMU) 32, a global positioning system (GPS) 34, radar 36, and LiDAR 38, however, is to be appreciated that additional sensors may be used as well. The one or more controllers 20 also in electronic communication with one or more longitudinal controllers 24 that control the longitudinal movement of the vehicle 12. The one or more longitudinal controllers 24 may be, for example, a proportional-integral-derivative controller, a model predictive control (MPC) controller, or a sliding mode controller.

As explained below, the one or more controllers 20 of the rules-based adaptive cruise control system 10 determines a vehicle-following behavior 86 of the vehicle 12 based on the perception data collected by the plurality of perception sensors 22 and a route plan indicating a selected route of the vehicle 12. The perception data collected by the plurality of perception sensors 22 is indicative of a detection state of a preceding vehicle 50. The preceding vehicle 50 is located immediately in front of the vehicle 12 along the roadway 52 (FIGS. 2A and 2B), where the rule-based adaptive cruise control system 10 maintains a predefined headway distance between the vehicle 12 and the preceding vehicle 50. The detection state is indicative of a preceding vehicle 50 momentarily falling outside a field-of-view (FOV) of the perception sensors 22 (FIGS. 2A and 2B) due to the geometry associated with the roadway 52. The vehicle-following behavior 86 is transmitted to the one or more longitudinal controllers 24. The one or more longitudinal controllers 24 determine a longitudinal control command 90 instructing the vehicle 12 to accelerate or decelerate based on the vehicle-following behavior 86.

Figure 2A:
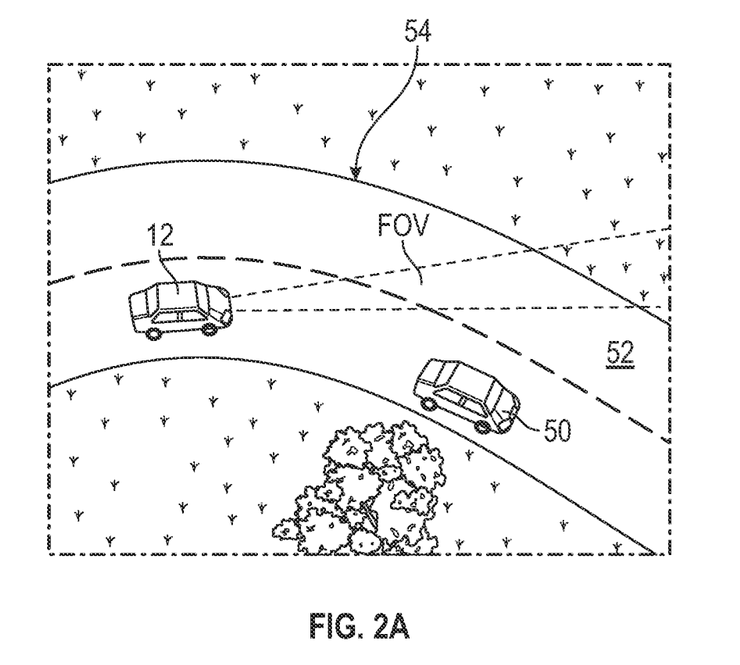
FIG. 2A illustrates the vehicle shown in FIG. 1 driving along a roadway and following a preceding vehicle around a curve, according to an exemplary embodiment.
Figure 2B:
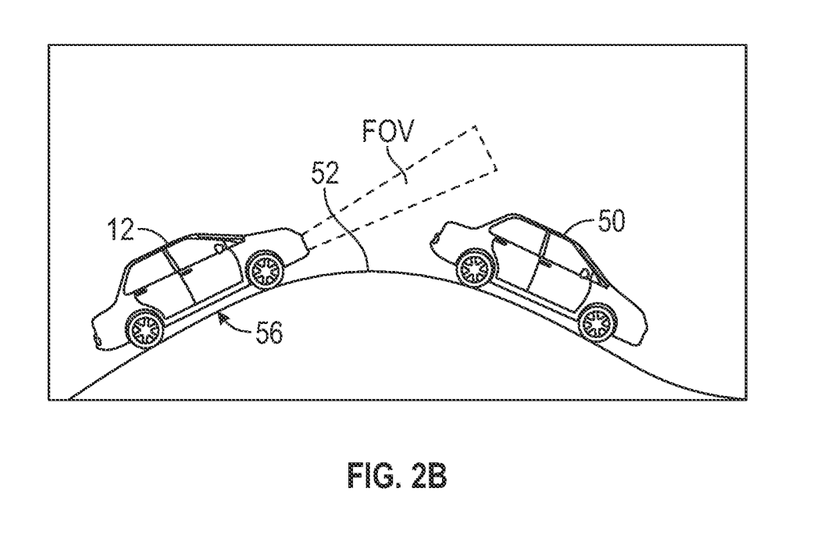
FIG. 2B illustrates the vehicle shown in FIG. 1 following the preceding vehicle along an incline, according to an exemplary embodiment.

FIGS. 2A and 2B illustrate the vehicle 12 following a preceding vehicle 50 along a roadway 52, where the preceding vehicle 50 momentarily leaves the field-of-view FOV of the plurality of perception sensors 22 (FIG. 1) without leaving the roadway 52 due to the geometry of the roadway 52. In the example as shown in FIG. 2A, the geometry of the roadway 52 has a profile including a curve 54, where the preceding vehicle 50 leaves the field-of-view FOV of the plurality of perception sensors 22 while traversing the curve 54 along the roadway 52. In the example as shown in FIG. 2B, the roadway 52 extends along an incline 56, and the preceding vehicle 50 leaves the field-of-view FOV of the perception sensors 22 as a vehicle 12 climbs the incline 56 and the preceding vehicle 50 travels down the incline 56.

Figure 3:
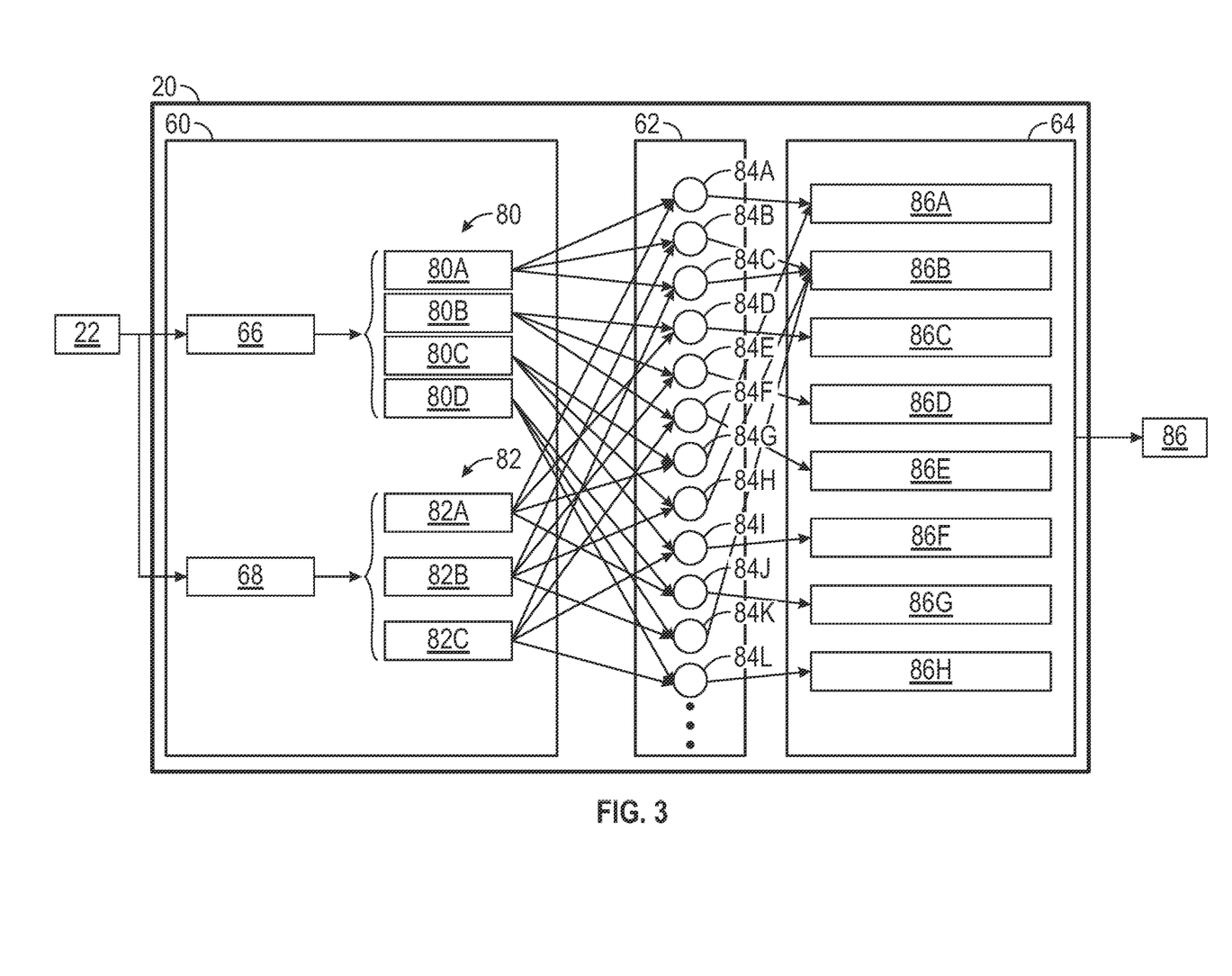
FIG. 3 is an illustration of the software architecture of the one or more controllers shown in FIG. 1, according to an exemplary embodiment.

FIG. 3 is an illustration of the architecture of the one or more controllers 20. The one or more controllers 20 include a perception module 60, a scenario classification module 62, and a behavior module 64. The perception module 60 includes a road profile submodule 66 and a vehicle detection submodule 68. Referring to both FIGS. 1 and 3, the road profile submodule 66 receives the route plan and the perception data collected by the plurality of perception sensors 22 representing the environment surrounding the vehicle 12, where the environment includes the roadway 52 (FIGS. 2A and 2B) the vehicle 12 is traveling along. The vehicle detection submodule 68 receives the perception data collected by the plurality of perception sensors 22 representing the environment surrounding the vehicle 12.

Referring to FIGS. 1, 2A, and 2B, the road profile submodule 66 of the perception module 60 categorizes a profile of the roadway 52 (FIGS. 2A and 2B) the vehicle 12 is presently traveling along based on the route plan and the perception data collected by the plurality of perception sensors 22 into one of a plurality of roadway profiles 80 that are each indicative of the geometry of the roadway 52. In the non-limiting embodiment as shown in FIG. 3, the roadway profiles 80 include a straight-line profile 80A, a curved profile 80B, an uphill profile 80C, and a downhill profile 80D. The straight-line profile 80A indicates a level roadway, where the preceding vehicle 50 is constantly within the field-of-view FOV of the plurality of perception sensors 22. In contrast, it is to be appreciated that the curved profile 80B, the uphill profile 80C, and the downhill profile 80D indicate a profile that has the potential to cause the preceding vehicle 50 to momentarily leave the field-of-view FOV of the plurality of perception sensors 22 while the still traveling along the roadway 52.

The vehicle detection submodule 68 of the perception module 60 of the one or more controllers 20 categorizes detection of the preceding vehicle 50 by the plurality of perception sensors 22 (FIG. 1) into one of a plurality of detection states 82. Specifically, the detection state 82 is indicative of the preceding vehicle 50 momentarily falling outside the field-of-view FOV of the perception sensors 22 due to the geometry of the roadway 52. In the embodiment as shown in FIG. 3, the detection states 82 include a not detected state 82A indicating no preceding vehicle 50 is detected by the perception sensors 22, a detected state 82B, and a detected but disappeared state 82C. The detected but disappeared state 82C indicates a situation as shown in either FIG. 2A or 2B, where the preceding vehicle 50 momentarily leaves the field-of-view FOV of the plurality of perception sensors 22 while traveling along the roadway 52 due to the geometry of the roadway 52.

The scenario classification module 62 of the one or more controllers 20 receives a selected roadway profile 80 determined by the road profile submodule 66 of the perception module 60 and a selected detection state 82 determined by the vehicle detection submodule 68 of the perception module 60. The scenario classification module 62 of the one or more controllers 20 classifies the selected roadway profile 80 and the selected detection state 82 into one of a plurality of scenarios 84 based on a set of classification rules, where the set of classification rules consider the profile of the roadway 52 (FIGS. 2A and 2B) and the detection state of the preceding vehicle 50. Each scenario 84 corresponds to a specific vehicle-following behavior 86 indicating operation of the vehicle 12, where the behavior module 64 assigns a specific vehicle-following behavior 86 based on a selected scenario 84. The vehicle-following behavior 86 is then sent to the longitudinal controllers 24 shown in FIG. 1, where the one or more longitudinal controllers 24 determine the longitudinal control command 90.

The set of classification rules are a set of conditional statements or if-then rules that classify the selected roadway profile 80 determined by the road profile submodule 66 of the perception module 60 and the selected detection state 82 determined by the vehicle detection submodule 68 of the perception module 60 into a selected scenario 84. In the example as shown in FIG. 3, the scenario classification module 62 includes twelve different scenarios 84A-84L. Each scenario 84 corresponds to a specific vehicle-following behavior 86.

In the example as shown in FIG. 3, eight different vehicle-following behaviors 86A-86H are shown. In an embodiment, the vehicle-following behavior 86A instructs the vehicle 12 to follow a target speed, the vehicle-following behavior 86B instructs the vehicle 12 to adhere to standard adaptive cruise control behavior, the vehicle-following behavior 86C instructs the vehicle 12 to reduce speed to negotiate a curved profile, the vehicle-following behavior 86D instructs the vehicle 12 to follow the preceding vehicle 50 according to the speed limit to negotiate the curved profile, the vehicle-following behavior 86E instructs the vehicle 12 to negotiate the curved profile without sudden acceleration, the vehicle-following behavior 86F instructs the vehicle 12 to negotiate the uphill profile without sudden acceleration, the vehicle-following behavior 86G instructs the vehicle 12 to negotiate a downhill profile based on an allowable speed variation, and the vehicle-following behavior 86H instructs the vehicle 12 to negotiate the downhill profile without sudden acceleration. Standard adaptive cruise control behavior refers to adapting vehicle speed automatically to maintain a predefined headway or distance to the vehicle ahead. Sudden acceleration is triggered by a temporary loss of detection of the preceding vehicle 50 and refers to acceleration that falls outside an acceptable range, where the acceptable range of acceleration is selected based on occupant comfort. Sudden acceleration may result in system-driven corrective braking, driver intervention, or driver discomfort from approaching the preceding vehicle 50 or negotiating a curve too aggressively.

As an example, when the selected roadway profile 80 is the straight-line profile 80A and the selected detection state 82 is the not detected state 82A indicating no preceding vehicle 50 is detected by the perception sensors 22, the scenario classification module 62 of the one or more controllers 20 classifies the selected roadway profile 80 and the selected detection state 82 as the selected scenario 84A, which corresponds to the vehicle-following behavior 86A instructing the vehicle 12 to follow the target speed. As another example, when the selected roadway profile 80 is the curved profile 80B and the selected detection state 82 is the detected state 82B, the scenario classification module 62 of the one or more controllers 20 classifies the selected roadway profile 80 and the selected detection state 82 as the selected scenario 84E, which corresponds to the vehicle-following behavior 86D instructing the vehicle 12 to follow the preceding vehicle 50 according to the speed limit to negotiate the curved profile. In yet another example, when the selected roadway profile 80 is the curved profile 80B and the selected detection state 82 is the detected but disappeared state 82C, the scenario classification module 62 of the one or more controllers 20 classifies the selected roadway profile 80 and the selected detection state 82 as the selected scenario 84F, which corresponds to the vehicle-following behavior 86E instructing the vehicle 12 to negotiate the curved profile without sudden acceleration.

Figure 4:
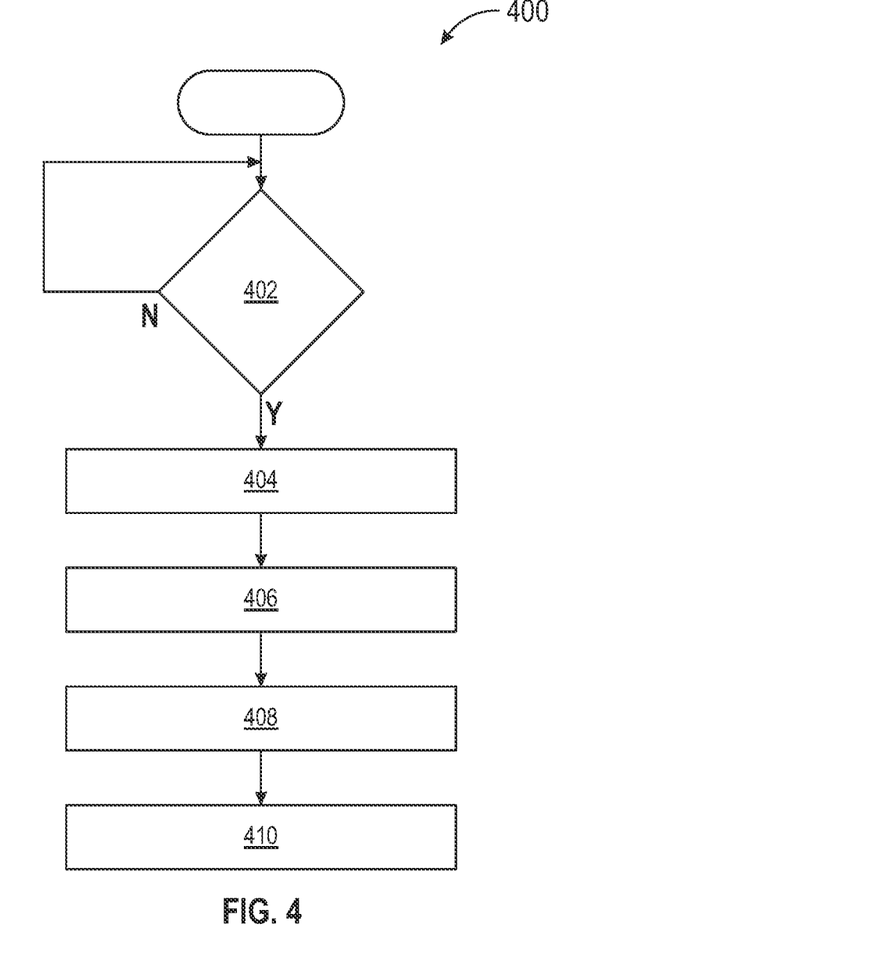
FIG. 4 is a process flow diagram illustrating a method for determining a vehicle-following behavior by the rule-based adaptive cruise control system, according to an exemplary embodiment.

FIG. 4 is a process flow diagram illustrating a method 400 for determining the vehicle-following behavior 86 by the rule-based adaptive cruise control system 10. Referring generally to FIGS. 1-4, the method 400 may begin at decision block 402. In decision block 402, the one or more controllers 20 continuously monitor the plurality of perception sensors 22 for the perception data. In response to receiving the perception data and the route plan, the method 400 proceeds to block 404.

In block 404, the road profile submodule 66 of the perception module 60 of the one or more controllers 20 categorizes the profile of the roadway 52 (shown in FIGS. 2A and 2B) based on the route plan and the perception data into one of the plurality of roadway profiles 80 that are each indicative of the geometry of the roadway 52. The method 400 may then proceed to block 406.

In block 406, the vehicle detection submodule 68 of the perception module 60 of the one or more controllers 20 categorizes detection of the preceding vehicle 50 based on the perception data into one of the plurality of detection states 82, where the plurality of detection states are indicative of the preceding vehicle 50 momentarily falling outside the field-of-view FOV of the perception sensors 22 due to a geometry associated with the roadway 52. The method 400 may then proceed to block 408.

In block 408, the scenario classification module 62 of the one or more controllers 20 classify the selected roadway profile 80 and the selected detection state 82 into one of a plurality of scenarios 84 based on a set of classification rules. The method 400 may then proceed to block 410.

In block 410, the behavior module 64 of the one or more controllers 20 assign a specific vehicle-following behavior 86 based on the selected scenario 84. The method 400 may then terminate.

Referring generally to the figures, the disclosed rule-based adaptive cruise control system provides various technical effects and benefits. Specifically, the disclosed rule-based adaptive cruise control system determines the vehicle-following behavior of an ego vehicle based on set of classification rules that consider the profile of the roadway and a detection state of a preceding vehicle, which results in reducing the instances of unnatural or sudden accelerations and decelerations that may occur with adaptive cruise control systems that are presently available. Reducing the instances of sudden accelerations and decelerations results in improved energy consumption and provides a more natural and comfortable driving experience to the occupants of the vehicle.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rule-based adaptive cruise control system for determining a vehicle-following behavior of a vehicle, the rule-based adaptive cruise control system comprising:
   a plurality of perception sensors for collecting perception data representing an environment surrounding the vehicle, wherein the environment includes a roadway the vehicle is traveling along and the perception sensor include a field-of-view;
   one or more controllers in electronic communication with the plurality of perception sensors, the one or more controllers executing instructions to:
      receive a route plan and the perception data collected by the plurality of perception sensors;
      categorize a profile of the roadway based on the route plan and the perception data into one of a plurality of roadway profiles that are each indicative of a geometry of the roadway;
      categorize detection of a preceding vehicle based on the perception data into one of a plurality of detection states, wherein the plurality of detection states are indicative of the preceding vehicle momentarily falling outside the field-of-view of the perception sensors due to a geometry associated with the roadway;
      classify a selected roadway profile and a selected detection state into one of a plurality of scenarios based on a set of classification rules; and
      assign a specific vehicle-following behavior based on a selected scenario.

2. The rule-based adaptive cruise control system of claim 1, wherein the preceding vehicle is located immediately in front of the vehicle along the roadway, and wherein the rule-based adaptive cruise control system maintains a predefined headway distance between the vehicle and the preceding vehicle.

3. The rule-based adaptive cruise control system of claim 1, wherein a longitudinal control command indicating when the vehicle accelerates and decelerates is based on the vehicle-following behavior.

4. The rule-based adaptive cruise control system of claim 1, wherein the set of classification rules are a set of conditional statements that classify the selected roadway profile and the selected detection state into the selected scenario.

5. The rule-based adaptive cruise control system of claim 1, wherein the roadway profiles include the following: a straight-line profile, a curved profile, an uphill profile, and a downhill profile.

6. The rule-based adaptive cruise control system of claim 5, wherein the straight-line profile indicates a level roadway.

7. The rule-based adaptive cruise control system of claim 1, wherein the detection states includes a not detected state, a detected state, and a detected but disappeared state.

8. The rule-based adaptive cruise control system of claim 1, wherein the detected but disappeared state indicates the preceding vehicle momentarily left the field-of-view of the plurality of perception sensors while traveling along the roadway.

9. The rule-based adaptive cruise control system of claim 1, wherein the vehicle-following behavior instructs the vehicle to perform one of the following: follow a target speed, adhere to standard adaptive cruise control behavior, reduce speed to negotiate a curved profile, follow the preceding vehicle according to a speed limit to negotiate the curved profile, negotiate the curved profile without sudden acceleration, negotiate an uphill profile without sudden acceleration, negotiate a downhill profile based on an allowable speed variation, and negotiate the downhill profile without sudden acceleration.

10. The rule-based adaptive cruise control system of claim 1, wherein the plurality of perception sensors include one or more of the following: one or more cameras, an inertial measurement unit (IMU), a global positioning system (GPS), radar, and LiDAR.

11. The rule-based adaptive cruise control system of claim 1, wherein the rule-based adaptive cruise control system is part of an advanced driver-assistance system (ADAS).

12. A method for determining a vehicle-following behavior of a vehicle by a rule-based adaptive cruise control system, the method comprising:
    receiving, by one or more controllers, a route plan and perception data collected by a plurality of perception sensors, wherein the perception data represents an environment surrounding the vehicle and the environment includes a roadway the vehicle is traveling along;
    categorizing a profile of the roadway based on the route plan and the perception data into one of a plurality of roadway profiles that are each indicative of a geometry of the roadway;
    categorizing detection of a preceding vehicle based on the perception data into one of a plurality of detection states, wherein the plurality of detection states are indicative of the preceding vehicle momentarily falling outside a field-of-view of the perception sensors due to a geometry associated with the roadway;
    classifying a selected roadway profile and a selected detection state into one of a plurality of scenarios based on a set of classification rules; and
    assigning a specific vehicle-following behavior based on a selected scenario.

13. A rule-based adaptive cruise control system for determining a vehicle-following behavior of a vehicle, the rule-based adaptive cruise control system comprising:
    a plurality of perception sensors for collecting perception data representing an environment surrounding the vehicle, wherein the environment includes a roadway the vehicle is traveling along and the perception sensors include a field-of-view;
    one or more controllers in electronic communication with the plurality of perception sensors, the one or more controllers executing instructions to:
        receive a route plan and the perception data collected by the plurality of perception sensors;
        categorize a profile of the roadway based on the route plan and the perception data into one of a plurality of roadway profiles that are each indicative of a geometry of the roadway;
        categorize detection of a preceding vehicle based on the perception data into one of a plurality of detection states, wherein the plurality of detection states are indicative of the preceding vehicle momentarily falling outside the field-of-view of the perception sensors due to a geometry associated with the roadway, wherein the preceding vehicle is located immediately in front of the vehicle along the roadway, and wherein the rule-based adaptive cruise control system maintains a predefined headway distance between the vehicle and the preceding vehicle;
        classify a selected roadway profile and a selected detection state into one of a plurality of scenarios based on a set of classification rules; and
        assign a specific vehicle-following behavior based on a selected scenario, wherein a longitudinal control command indicating when the vehicle accelerates and decelerates is based on the vehicle-following behavior.

14. The rule-based adaptive cruise control system of claim 13, wherein the set of classification rules are a set of conditional statements that classify the selected roadway profile and the selected detection state into the selected scenario.

15. The rule-based adaptive cruise control system of claim 13, wherein the roadway profiles include the following: a straight-line profile, a curved profile, an uphill profile, and a downhill profile.

16. The rule-based adaptive cruise control system of claim 15, wherein the straight-line profile indicates a level roadway.

17. The rule-based adaptive cruise control system of claim 13, wherein the detection states includes a not detected state, a detected state, and a detected but disappeared state.

18. The rule-based adaptive cruise control system of claim 13, wherein the detected but disappeared state indicates the preceding vehicle momentarily left the field-of-view of the plurality of perception sensors while traveling along the roadway.

19. The rule-based adaptive cruise control system of claim 13, wherein the vehicle-following behavior instructs the vehicle to perform one of the following: follow a target speed, adhere to standard adaptive cruise control behavior, reduce speed to negotiate a curved profile, follow the preceding vehicle according to a speed limit to negotiate the curved profile, negotiate the curved profile without sudden acceleration, negotiate an uphill profile without sudden acceleration, negotiate a downhill profile based on an allowable speed variation, and negotiate the downhill profile without sudden acceleration.

20. The rule-based adaptive cruise control system of claim 13, wherein the plurality of perception sensors include one or more of the following: one or more cameras, an IMU, a GPS, radar, and LiDAR.

* * * * *